Patented Aug. 1, 1933

1,920,403

UNITED STATES PATENT OFFICE

1,920,403

PROCESS FOR PRODUCING POLYMERIZATION PRODUCTS OF VINYL HALIDES

Fritz Klatte, Rheinfelden in Baden, and Hermann Müller, Frankfort-on-the-Main/Schwanheim, Germany, assignors to I. G. Farbenindustrie Aktiengesellschaft, Frankfort - on - the - Main, Germany No Drawing. Application August 4, 1931, Serial No. 555,135, and in Germany August 8, 1930

6 Claims. (Cl. 260—2)

Our invention relates to a process for the production of polyvinyl halides of high molecular weight.

We have ascertained by experiments that polymerization products of the vinyl halides of high molecular weight,—exhibiting a high and comparatively uniform degree of polymerization and insolubility in most solvents,—can be produced by heating to a moderately elevated temperature a vinyl halide with catalysts known per se, of the group of peroxides in the absence of solvents or diluents, and, if desired, in the presence of anhydrides of organic acids, the heating being performed in a closed vessel and continued only until a portion—such as one half—of the vinyl halide employed has become polymerized. The monomeric vinyl halide which has taken no part in the reaction is recovered by distillation.

By proceeding in this manner in accordance with the invention, a polymerization product is obtainable which has proved to be much more uniform than the average product of a complete polymerization, which latter always contains a plurality of products of different stages of polymerization. Moreover, a partial polymerization is advantageous, since it permits an exact separation of the remaining monomeric vinyl halide from a polymerized product of definite quality. Another advantage of the herein described process resides in the fact that the presence of the liquid vinyl halide ensures a uniform distribution of the catalyst in the reacting medium.

If, under otherwise equal conditions, vinyl halides are employed which have been subjected to a preliminary irradiation—for example by passing vinyl chloride, in the gaseous state, through a quartz tube illuminated by a mercury-vapor lamp, prior to admission into the autoclave—the polymerization process is considerably accelerated.

The highly polymerized product obtained by the process of the present invention is particularly suitable for the production of plastic compositions, and is distinguished by high heat-resisting and elastic properties. Our invention is illustrated by the examples following hereafter.

(1) 1000 grams of vinyl chloride are maintained at a temperature of 35–45° C. for 24 to 30 hours in a stirring autoclave, in presence of 6 grams of barium peroxide and 6 grams of acetic anhydride. At the end of that period, the unconverted vinyl chloride is distilled off, and about 500 grams of pulverulent, white polyvinyl chloride are recovered. The polymerization is effected practically free from loss.

(2) 1000 grams of vinyl chloride containing 5 grams of benzoyl peroxide are heated to a temperature of 50–60° C., in a stirring autoclave, for 24 hours. The unpolymerized vinyl chloride is then distilled off, and 400 to 500 grams of pulverulent polyvinyl chloride are obtained. Vinyl chloride may be replaced by vinyl bromide, or mixtures of the said vinyl halides.

(3) 1000 parts of vinyl chloride are passed in the gaseous state through a quartz tube illuminated by a mercury-vapor lamp and then recondensed to the liquid state, whereafter 10 parts of peroxide of barium and 10 parts of acetic anhydride are added. The mixture when heated in an autoclave for 10 hours to 35–45° C. yields about 350 parts of polyvinyl chloride, whereas the same mixture at the same conditions without prior illumination yields only about 250 parts of polyvinyl chloride.

By the exposure to active light rays preceding polymerization by heating in the autoclave no polymerization of the vinyl halide occurs; the latter is only activated so that polymerization by heat is facilitated.

Obviously, our invention is not limited to the foregoing examples or to the specific details given therein. Thus, for instance, polymerization of the vinyl halide may be carried out at a somewhat higher temperature not exceeding, however, 100° C. On the other hand, the temperature may be lowered and polymerization occurs even at 30° C.

We claim:

1. The process of producing polymerization products of vinyl chloride which comprises heating 1000 parts of vinyl chloride containing about 5 parts of benzoyl peroxide within an autoclave to about 50 to 60° C., maintaining said temperature for about 24 hours and distilling off the unconverted monomeric vinyl chloride from the resulting pulverulent polyvinyl chloride.

2. The process of producing polymerization products of vinyl chloride which comprises heating 1000 parts of vinyl chloride containing about 6 parts of barium peroxide and 6 parts of acetic anhydride within an autoclave to about 35–45° C., maintaining said temperature for about 24–30 hours, and distilling off the unconverted monomeric vinyl chloride from the resulting pulverulent polyvinyl chloride.

3. The process of producing polymerization products of vinyl chloride which comprises passing 1000 parts of vinyl chloride in the gaseous state thru a quartz tube illuminated by a mercury-vapor lamp, recondensing the irradiated vapor to the liquid state, dissolving in the liquid about 10 parts of peroxide of barium and 10 parts of acetic anhydride, heating said mixture in an autoclave for about 10 hours to 35-45° C. and then distilling off the monomeric vinyl chloride.

4. In the process for polymerizing vinyl halide by exposure to heat in the presence of a peroxide catalyst and in the absence of a diluent, the steps which comprise carrying out polymerization in a closed vessel at a moderately elevated temperature not exceeding 100° C., interrupting polymerization when about one half of the monomeric vinyl halide is polymerized and thereupon separating the polymerized product by distilling off the monomeric vinyl halide.

5. In the process for polymerizing vinyl halide by exposure to heat in the presence of a peroxide catalyst and in the absence of a diluent, the steps which comprise carrying out polymerization in a closed vessel at a temperature between about 30 to about 60° C., interrupting polymerization when about one half of the monomeric vinyl halide is polymerized and thereupon separating the polymerized product by distilling off the monomeric vinyl halide.

6. In the process for polymerizing vinyl halide by exposure to heat in the presence of a peroxide catalyst and in the absence of a diluent, the steps which comprise activating the vinyl halide by exposing it in the gaseous state to the action of actinic light rays, carrying out polymerization in a closed vessel at a temperature between about 30 to about 60° C., interrupting polymerization when about one half of the monomeric vinyl halide is polymerized and thereupon separating the polymerized product by distilling off the monomeric vinyl halide.

FRITZ KLATTE.
HERMANN MÜLLER.

DISCLAIMER 1,920,403.—*Fritz Klatte*, Rheinfelden in Baden, and *Hermann Müller*, Frankfort-on-the-Main/Schwanheim, Germany. PROCESS FOR PRODUCING POLYMERIZATION PRODUCTS OF VINYL HALIDES. Patent dated August 1, 1933. Disclaimer filed October 17, 1935, by the assignee, *I. G. Farbenindustrie Aktiengesellschaft*.

Hereby disclaims claims 1 and 4.
[*Official Gazette November 5, 1935.*]